United States Patent
Kovach et al.

(10) Patent No.: US 9,686,899 B2
(45) Date of Patent: Jun. 27, 2017

(54) SPRING GUIDE

(71) Applicant: CNH Industrial America LLC, New Holland, PA (US)

(72) Inventors: Michael G. Kovach, Morton, IL (US); Rick L. Gerber, Roanoke, IL (US)

(73) Assignee: CNH Industrial America LLC, New Holland, PA (US)

( * ) Notice: Subject to any disclaimer, the term of this patent is extended or adjusted under 35 U.S.C. 154(b) by 275 days.

(21) Appl. No.: 14/464,533

(22) Filed: Aug. 20, 2014

(65) Prior Publication Data

US 2015/0053434 A1 Feb. 26, 2015

Related U.S. Application Data

(60) Provisional application No. 61/868,290, filed on Aug. 21, 2013.

(51) Int. Cl.
*A01B 61/04* (2006.01)
*A01B 33/02* (2006.01)
*A01B 49/02* (2006.01)

(52) U.S. Cl.
CPC .......... *A01B 61/046* (2013.01); *A01B 33/025* (2013.01); *A01B 49/027* (2013.01)

(58) Field of Classification Search
CPC ... A01B 33/025; A01B 33/144; A01B 33/148; A01B 35/06; A01B 35/12; A01B 35/24; A01B 61/046
See application file for complete search history.

(56) References Cited

U.S. PATENT DOCUMENTS

| | | | | |
|---|---|---|---|---|
| 3,536,146 A | * | 10/1970 | Groenke | A01B 35/24 172/710 |
| 3,603,575 A | * | 9/1971 | Arlasky | B60G 17/021 267/34 |
| 3,700,039 A | * | 10/1972 | Essex | A01B 61/046 172/265 |
| 4,073,347 A | | 2/1978 | Philpot | |
| 4,127,341 A | * | 11/1978 | Stevens | A01B 61/046 172/178 |

(Continued)

FOREIGN PATENT DOCUMENTS

GB 834 417 5/1960

OTHER PUBLICATIONS

Russian Office Action and the translation thereof dated Jul. 1, 2015 for Russian Application No. 2014124725/13 (040171) (11 pages).

(Continued)

*Primary Examiner* — Matthew D Troutman
(74) *Attorney, Agent, or Firm* — Rebecca L. Henkel; Rickard K. DeMille

(57) ABSTRACT

An agricultural tillage implement includes: a frame member; and a leveling blade assembly. The leveling blade assembly includes: a leveling blade; an arm coupling the frame member with the leveling blade; and a spring assembly including a spring and a spring guide assembly, the spring and the spring guide assembly being coupled with the arm and the frame member, the spring guide assembly including a sleeve which is slidably related to the spring and which is made of an ultra-high-molecular-weight (UHMW) plastic.

18 Claims, 7 Drawing Sheets

(56) References Cited

U.S. PATENT DOCUMENTS

| | | | |
|---|---|---|---|
| 4,177,865 A * | 12/1979 | Lewison | A01B 35/24 |
| | | | 172/705 |
| 4,200,157 A * | 4/1980 | Anderson | A01B 61/046 |
| | | | 172/264 |
| 4,423,535 A | 1/1984 | Ojima et al. | |
| 4,736,931 A | 4/1988 | Christopherson | |
| 5,080,178 A | 1/1992 | Dietrich, Sr. | |
| 5,165,486 A * | 11/1992 | Davidson | A01B 49/02 |
| | | | 172/499 |
| 5,454,550 A | 10/1995 | Christopherson | |
| 5,595,130 A * | 1/1997 | Baugher | A01O 5/06 |
| | | | 111/164 |
| 5,720,369 A | 2/1998 | Thorn | |
| 5,787,992 A * | 8/1998 | Dobson | A01B 61/046 |
| | | | 172/264 |
| 5,823,518 A | 10/1998 | Nagamitsu et al. | |
| 5,961,106 A * | 10/1999 | Shaffer | B60G 13/008 |
| | | | 267/221 |
| 6,116,584 A | 9/2000 | Römer | |
| 6,250,398 B1 * | 6/2001 | Zaun | A01B 61/046 |
| | | | 172/265 |
| 6,564,728 B2 * | 5/2003 | Ryan | A01B 61/046 |
| | | | 111/123 |
| 6,681,868 B2 * | 1/2004 | Kovach | A01B 13/08 |
| | | | 172/146 |
| 7,216,861 B1 | 5/2007 | LaBarbera | |
| 7,401,561 B1 * | 7/2008 | Kurz | A01C 7/205 |
| | | | 111/62 |
| 7,806,197 B2 * | 10/2010 | Steinlage | A01B 49/02 |
| | | | 172/145 |
| 7,879,007 B2 | 2/2011 | Hommann | |
| 8,286,566 B2 * | 10/2012 | Schilling | A01C 7/205 |
| | | | 111/163 |
| 8,366,082 B2 | 2/2013 | Evans | |
| 8,479,670 B2 * | 7/2013 | Schilling | A01C 7/205 |
| | | | 111/163 |
| 8,596,374 B2 * | 12/2013 | Kile | A01B 23/02 |
| | | | 172/265 |
| 9,155,240 B2 * | 10/2015 | Redekop | A01B 73/044 |
| 2003/0141641 A1 | 7/2003 | Adoline et al. | |
| 2003/0178758 A1 | 9/2003 | Metelski | |
| 2006/0027955 A1 | 2/2006 | Adoline et al. | |
| 2006/0130713 A1 | 6/2006 | Jones et al. | |
| 2010/0096894 A1 | 4/2010 | Fukai | |
| 2011/0114427 A1 | 5/2011 | Parida et al. | |

OTHER PUBLICATIONS

"Polymeric Materials", Yu. A. Mikhaylin, Ultra-High Molecular Weight Polyethylene, No. 3(46), 2003 (30 pages).

* cited by examiner

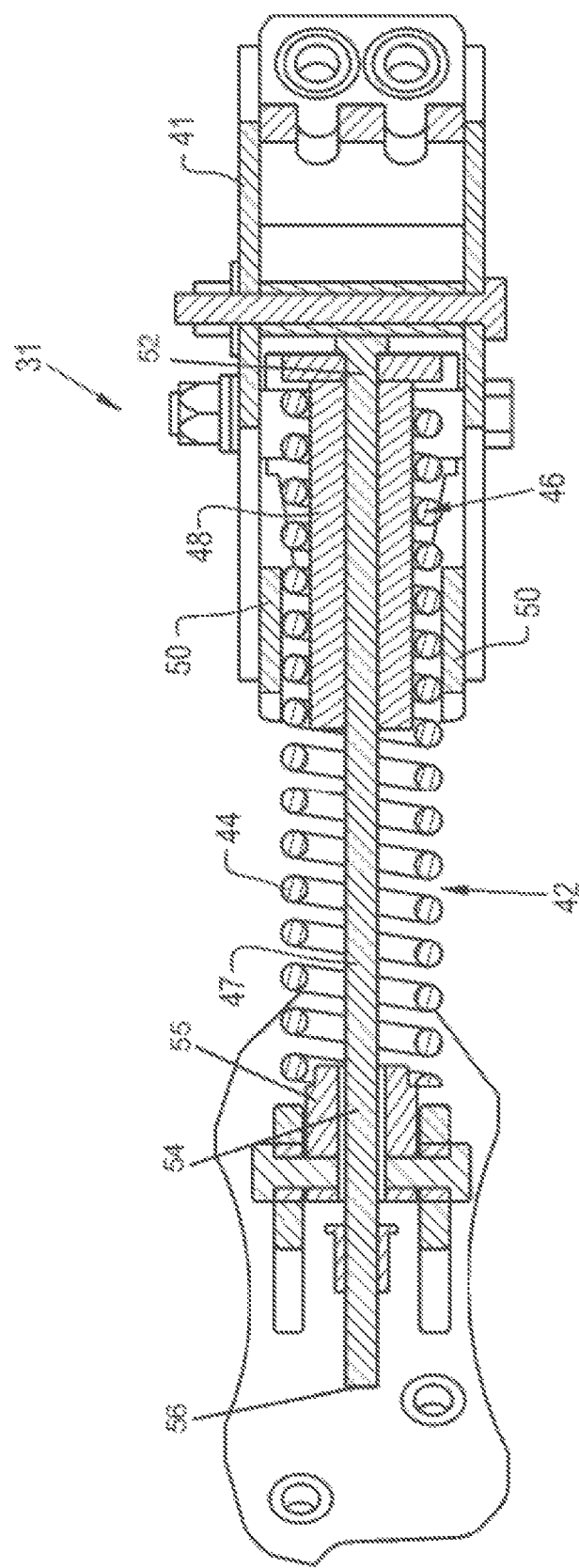

SPRING GUIDE

CROSS REFERENCE TO RELATED APPLICATIONS

This is a non-provisional application based upon U.S. provisional patent application Ser. No. 61/868,290, entitled "SPRING GUIDE," filed Aug. 21, 2013, which is incorporated herein by reference.

BACKGROUND OF THE INVENTION

1. Field of the Invention

The present invention relates to agricultural implements, and, more particularly, to spring guides of agricultural tillage implements.

2. Description of the Related Art

Farmers utilize a wide variety of tillage implements to prepare soil for planting. Some such implements include two or more sections coupled together to perform multiple functions as they are pulled through fields by a tractor, for example, a cultivator/harrow which is capable of simultaneously tilling soil and leveling the tilled soil in preparation for planting. This implement includes a cultivator that is towed by a tractor, and a harrow that is towed by the cultivator.

In one type of tilling operation, rows or gangs of circular disk blades are pulled through the soil at variable depths to break up clods or lumps of soil, as well as old plant material to provide a more amenable soil structure for planting and to level the soil surface. The gangs of disks are arranged on frames that extend generally laterally with respect to the direction of movement through a field and more particularly are angled with respect to the direction of movement.

Further, leveling blades can be supported by a frame member of a tillage implement by way of an arm. Movement of such an arm can be influenced by a spring which has a spring guide therein, the spring guide being made of metal.

What is needed in the art is an arm which permits movement of the leveling blade and a way of influencing movement of the arm which can withstand rigorous application.

SUMMARY OF THE INVENTION

The present invention provides a spring in conjunction with a spring guide, the spring guide being made of a wear resistant material.

The invention in one form is directed to an agricultural tillage implement which includes: a frame member; and a leveling blade assembly. The leveling blade assembly includes: a leveling blade; an arm coupling the frame member with the leveling blade; and a spring assembly including a spring and a spring guide assembly, the spring and the spring guide assembly being coupled with the arm and the frame member, the spring guide assembly including a sleeve which is slidably related to the spring and which is made of an ultra-high-molecular-weight (UHMW) plastic.

The invention in another form is directed to a leveling blade assembly of an agricultural tillage implement including a frame member. The leveling blade assembly includes: a leveling blade; an arm configured for coupling the frame member with the leveling blade; and a spring assembly including a spring and a spring guide assembly, the spring and the spring guide assembly being coupled with the arm and being configured for being coupled with the frame member, the spring guide assembly including a sleeve which is slidably related to the spring and which is made of an ultra-high-molecular-weight (UHMW) plastic.

The invention in yet another form is directed to a method of using an agricultural tillage implement, the method including the steps of: providing a frame member and a leveling blade assembly, the leveling blade assembly including a leveling blade, an arm coupling the frame member with the leveling blade, and a spring assembly including a spring and a spring guide assembly, the spring and the spring guide assembly being coupled with the arm and the frame member, the spring guide assembly including a sleeve which is made of an ultra-high-molecular-weight (UHMW) plastic; and sliding the spring on the sleeve.

An advantage of the present invention is that it reduces the wear of the spring on the sleeve, as well as the wear of the sleeve itself.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein:

FIG. 8 is a cross-sectional view of the leveling blade assembly shown in FIG. 7 taken along line 8-8.

Corresponding reference characters indicate corresponding parts throughout the several views. The exemplifications set out herein illustrate one embodiment of the invention, and such exemplifications are not to be construed as limiting the scope of the invention in any manner.

DETAILED DESCRIPTION OF THE INVENTION

Figure 1:
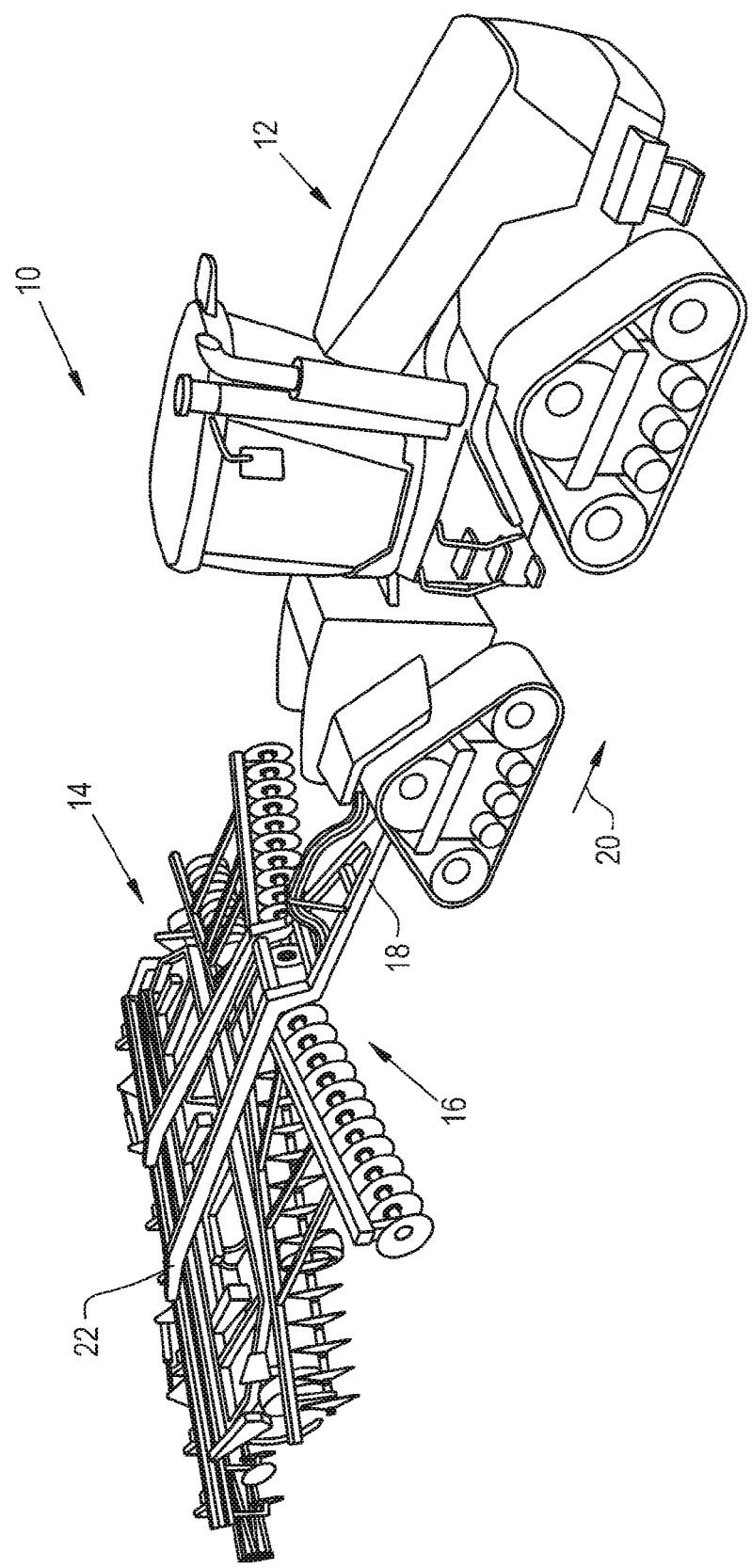
FIG. 1 illustrates a tillage implement having an embodiment of the spring guide of the present invention being pulled by a tractor.

Referring now to the drawings, and more particularly to FIG. 1, there is shown a tillage apparatus 10 which generally includes a tractor 12 and an agricultural tillage implement 14 for tilling and finishing soil prior to seeding.

Figure 2:
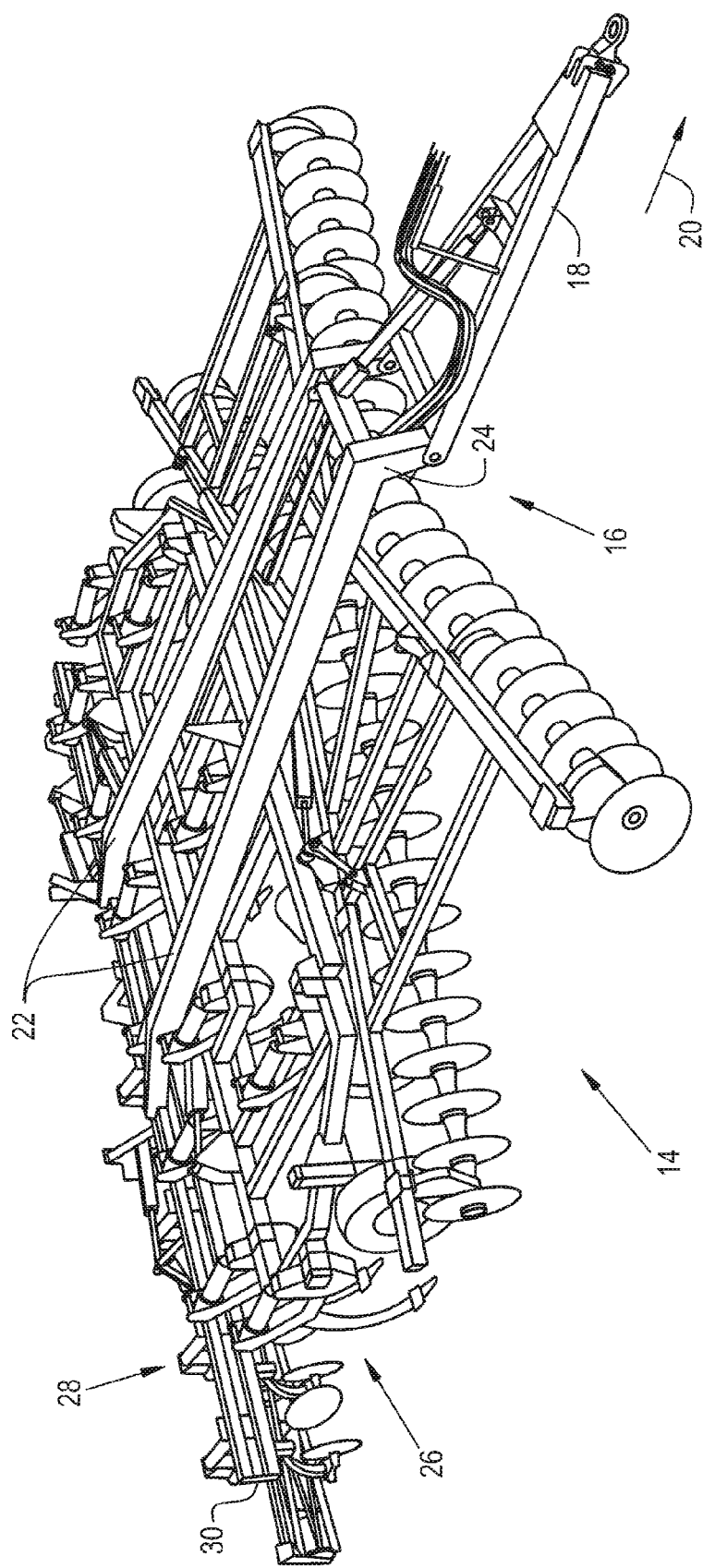
FIG. 2 is a perspective view of the tillage implement of FIG. 1.
Figure 3:
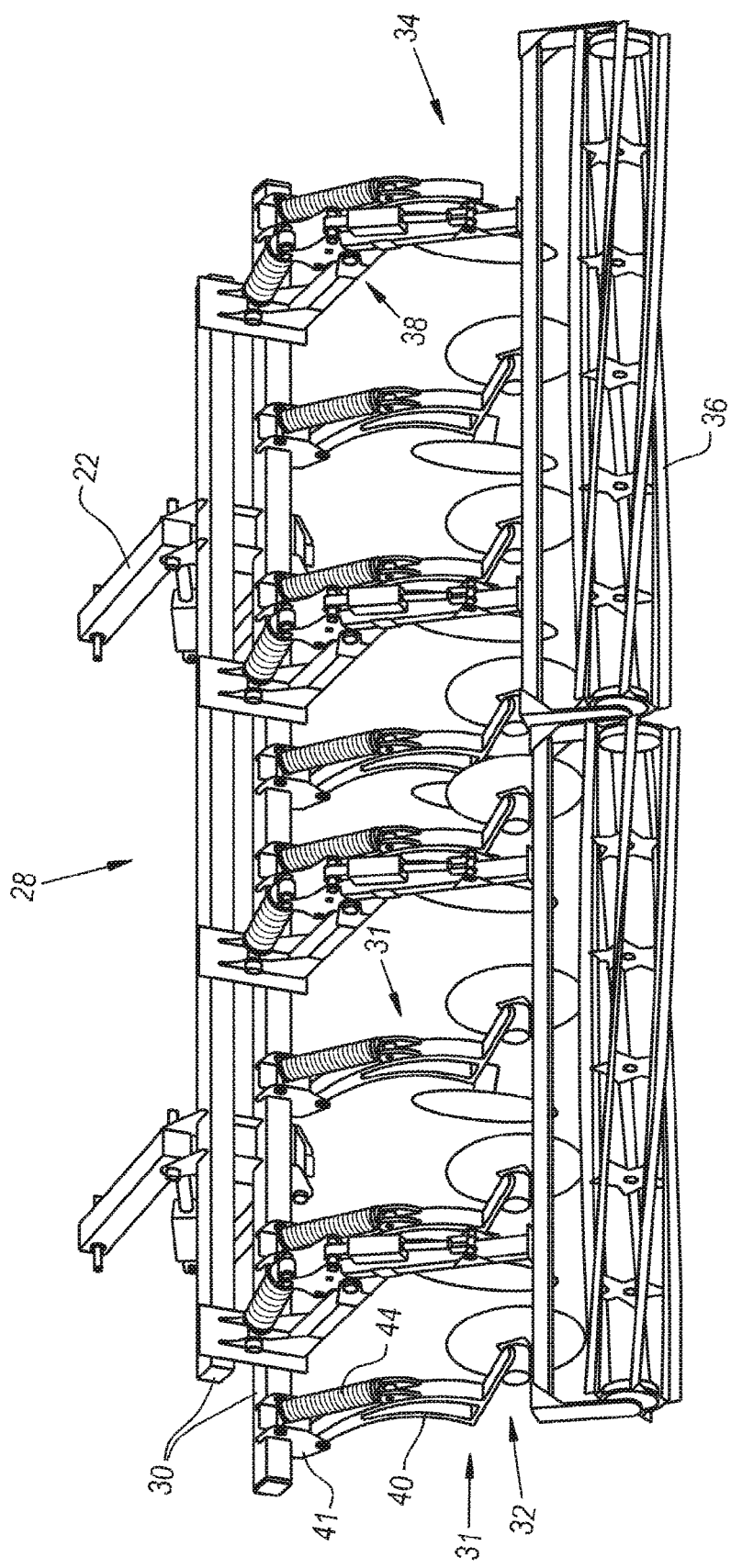
FIG. 3 is a partial rear perspective view of the tillage implement of FIGS. 1 and 2.
Figure 4:
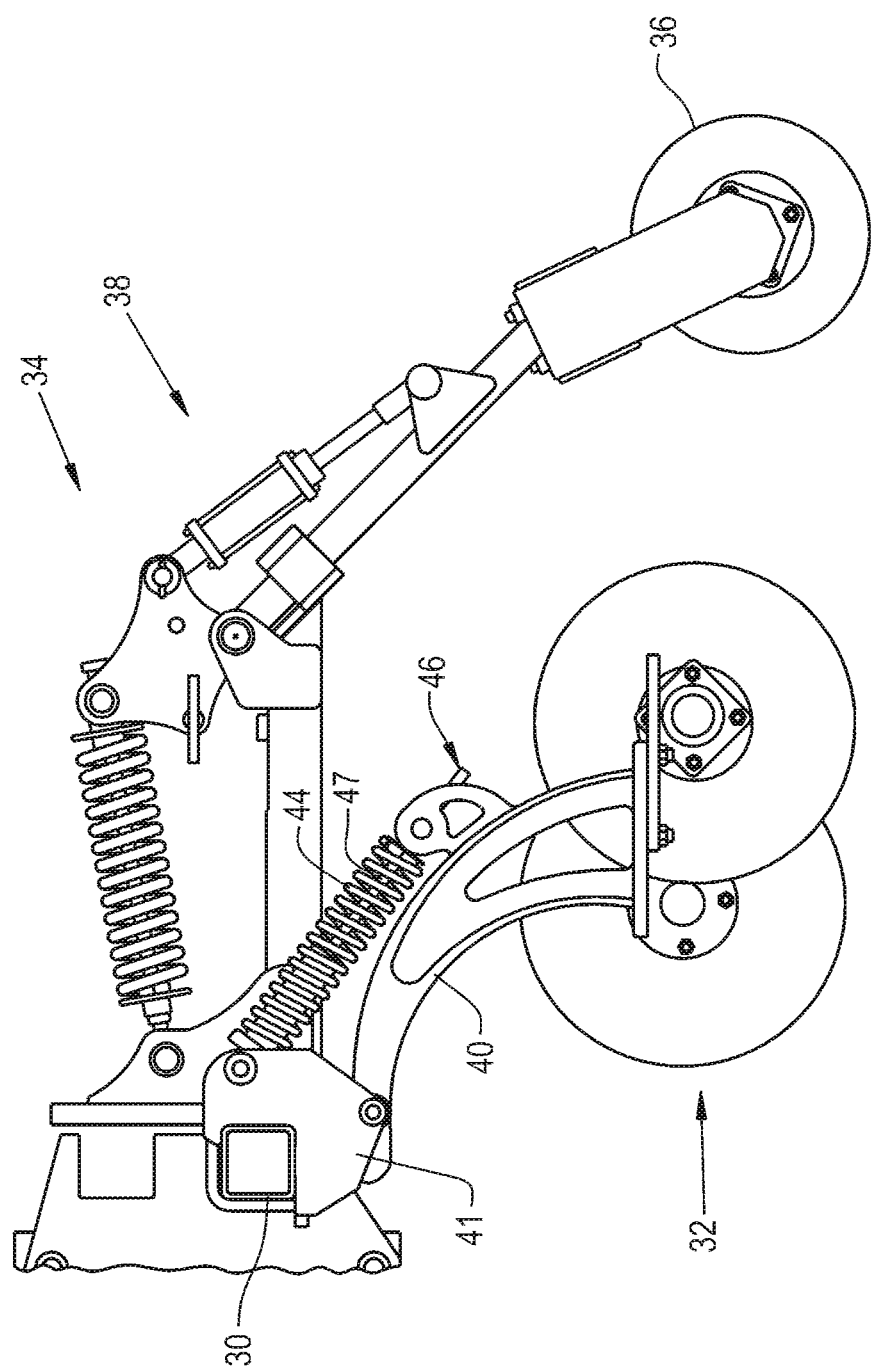
FIG. 4 is a side view of a rolling basket assembly of FIGS. 1-3, with the basket arm in a down position.

Now, additionally referring to FIGS. 2-4, agricultural tillage implement 14 is configured as a multi-section field disk ripper 14, and includes a main frame section 16. Main frame section 16 is the section that is directly towed by a traction unit, such as agricultural tractor 12. Main frame section 16 includes a pull hitch 18 generally extending in a travel direction 20, and a frame member 22 which is coupled with and extends from pull hitch 18. Reinforcing gusset plates 24 may be used to strengthen the connection between pull hitch 18 and frame member 22. Main frame section 16 generally functions to carry a shank frame 26 for tilling the soil, and a rear implement 28 for finishing the soil. Rear implement 28 includes a secondary frame 30, leveling blades 32 and rolling (aka, crumbler) basket assemblies 34, which coact with each other to finish the soil in preparation for planting. Leveling blades 32 and rolling basket assemblies 34 are both attached to secondary frame 30. Rolling basket assemblies 34 each include a rolling basket 36 with two arm assemblies 38 coupling the rolling basket assemblies 34 to secondary frame 30.

Figure 5:
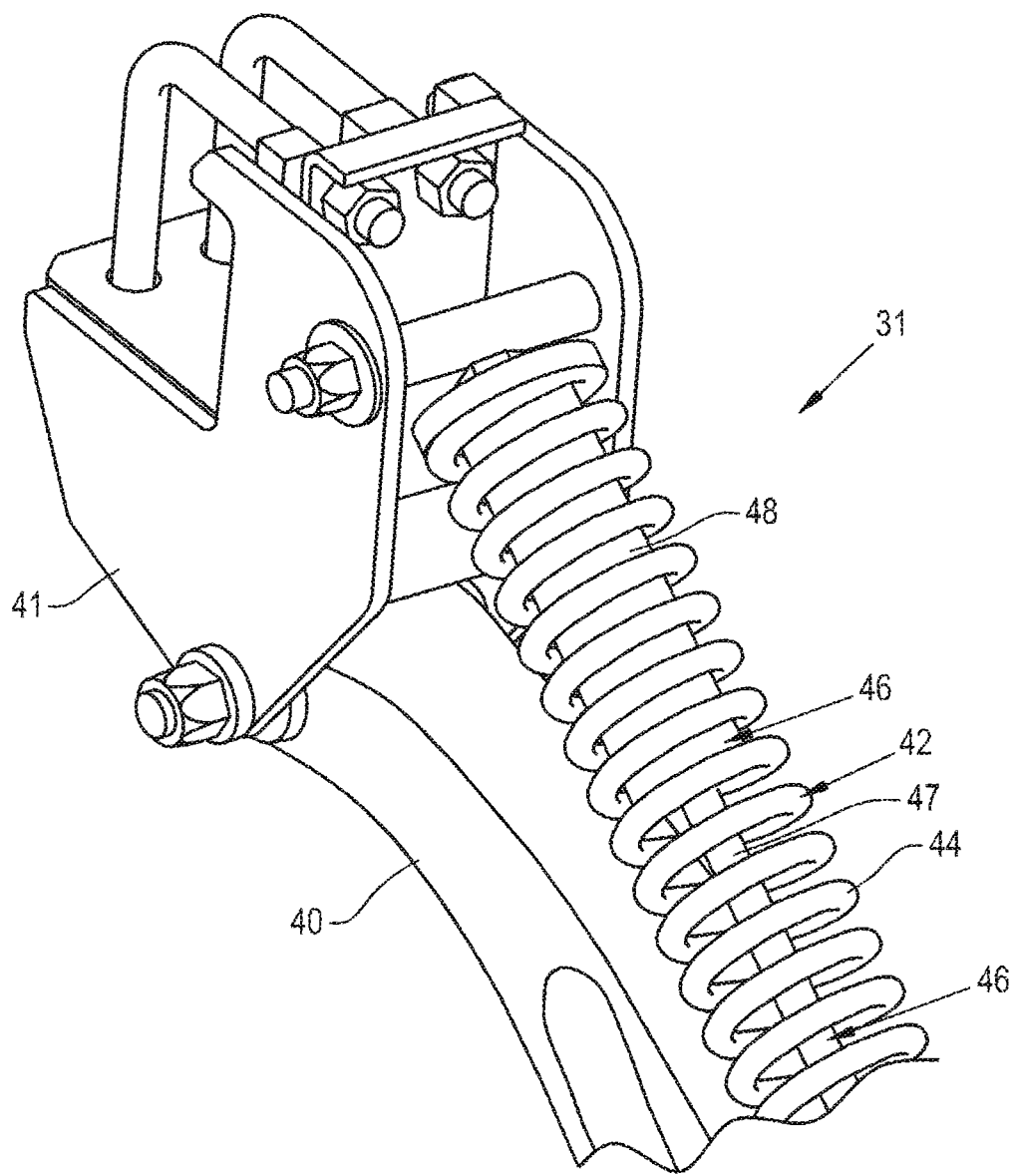
FIG. 5 is perspective view of the leveling blade assembly of FIGS. 3 and 4, according to the present invention.

Rear implement 28 of agricultural tillage implement 14 thus includes frame member 30 (which is also referred to herein as secondary frame member 30) and a leveling blade assembly 31. Leveling blade assembly 31 is shown in FIGS. 3-5. Leveling blade assembly 31 includes leveling blade 32, an arm 40 coupling frame member 30 with leveling blade 32, and a spring assembly 42. Arm 40 is pivotally coupled with frame member 30 by way of a mounting mechanism 41. Leveling blade 32, arm 40, and frame member 30 can each be made of steel for example.

Spring assembly 42 includes a spring 44 and a spring guide assembly 46. Spring 44 and spring guide assembly 46 are coupled with arm 40 and frame member 30, as shown in FIGS. 3-5. Spring 44 is a compression spring and biases arm to a generally downward position, thereby biasing leveling blades 32 to the ground. Spring 44 can be made of steel, for example.

Spring guide assembly 46 is a shock absorber 46 which is positioned within spring 44. Spring guide assembly 46 coacts with spring 44 to influence the movement of arm 40. Spring guide assembly 46 dampens the oscillations of spring 44. Spring guide assembly 46 includes a sleeve 48, which can also be referred to as a spring guide 48. The leveling blade assembly 31 can also include a bolt 47 that is partially covered by the spring guide 48 and connected to the arm 40, as shown. Sleeve 48 is slidably related to spring 44; more specifically, spring 44 slides on the outside of sleeve 48. Sleeve 48 is made of an ultra-high-molecular-weight (UHMW) plastic. This UHMW plastic is UHMW polyethylene. UHMW sleeve 48 serves to keep spring 44 from bowing when spring 44 is compressed. Without such a sleeve 48, compression spring 44 would bow and prematurely wear out or would break when working back-and-forth. UHMW sleeve 48 is slightly smaller in diameter than the inside diameter of spring 44. The UHMW material of sleeve 48 keeps spring 44 from wearing out as spring 44 rubs against the UHMW material (the outside diameter of sleeve 48 being made of UHMW material).

In summary, spring guides (such as spring guide assembly 46 or, more specifically, sleeve 48) are required to keep spring 44 straight so as not to bow during the spring compression cycle of spring 44. This allows the spring forces to be transferred straight along the axis of the centerline of spring 44 and the bolt 47. Currently, spring guides are typically metallic; but, this causes the spring material to wear over time and the spring to break due to stress risers resulting from worn areas.

According to the present invention, however, the UHMW (non-metallic) material sleeve 48 inside of the spring is advantageous. Since the UHMW material of sleeve 48 is non-metallic, this material does not wear the inside of the spring material of spring 44. Likewise, the UHMW material of sleeve 48 works well to withstand wear on the sleeve component (that is, sleeve 48), such wear being caused, for example, by spring 44.

During assembly, before installing compression spring 44, the installer should press UHMW sleeve 48 over the stud supporting spring 44. Then, the installer can slide spring 44 over UHMW sleeve 48.

In use, spring 44 slides over sleeve 48 during compression and expansion of spring 44. Because sleeve 48 is made of UHMW plastic, the wear of spring 44 is reduced, thereby increasing the life of spring 44.

The present invention further provides a method for a method of using an agricultural tillage implement 14, 28. The method includes the steps of: providing a frame member 30 and a leveling blade assembly 31, leveling blade assembly 31 including a leveling blade 32, an arm 40 coupling frame member 30 with leveling blade 32, and a spring assembly 42 including a spring 44 and a spring guide assembly 46, spring 44 and spring guide assembly 46 being coupled with arm 40 and frame member 30, spring guide assembly 46 including a sleeve 48 which is made of an ultra-high-molecular-weight (UHMW) plastic; and sliding spring 44 on sleeve 48. Spring 44 is a compression spring 44 and the UHMW plastic is a UHMW polyethylene. Spring guide assembly 46 is a shock absorber 46 which is positioned within spring 44.

Figure 6:
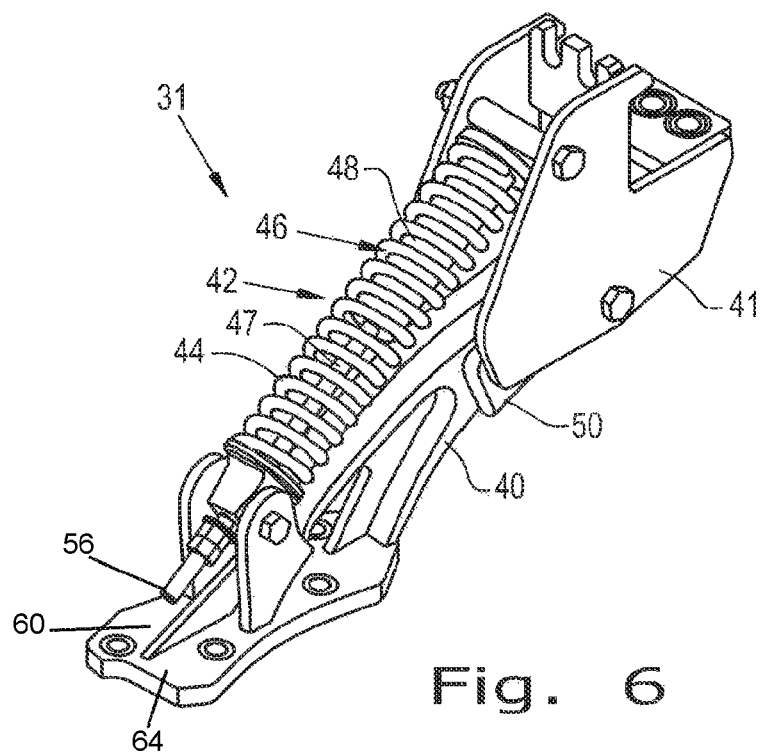
FIG. 6 is a perspective view of the leveling blade assembly of FIGS. 3-5 that includes saddle guides.
Figure 7:
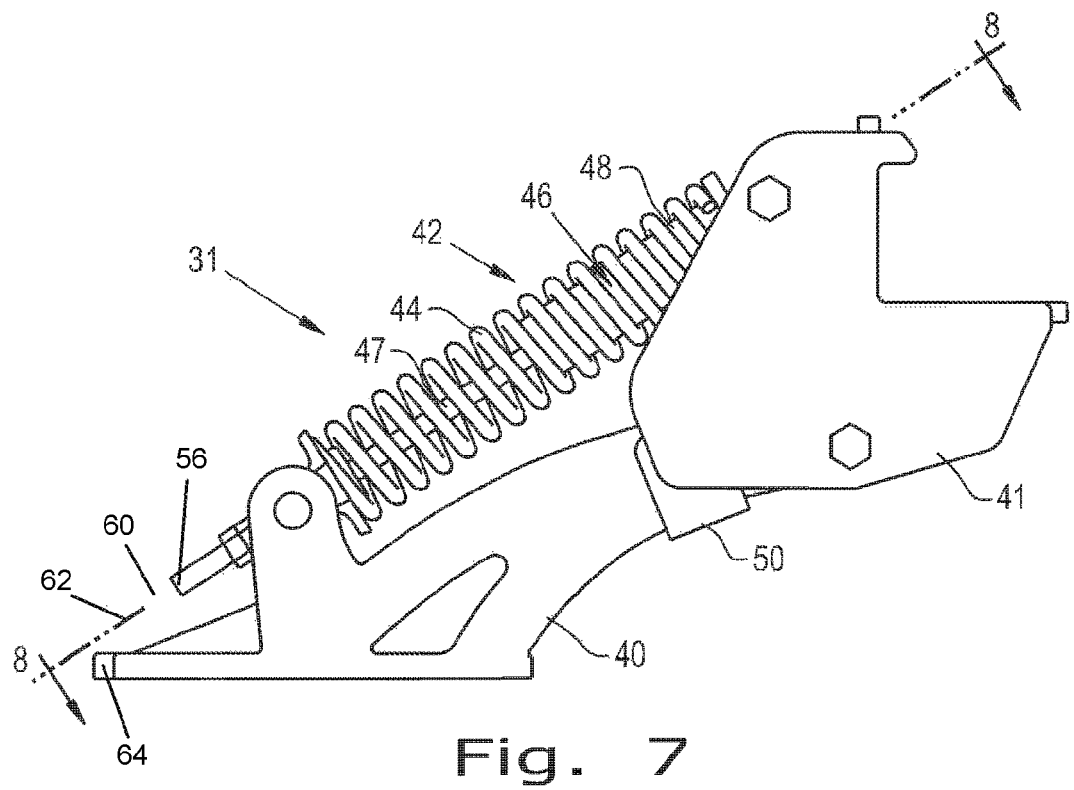
FIG. 7 is another perspective view of the leveling blade assembly shown in FIG. 6.

Optionally, as can be seen in FIGS. 6-8, one or more saddle guides 50 can be connected to the mounting mechanism 41 between the mounting mechanism 41 and the arm 40. The saddle guide(s) 50 can act as a bumper, of sorts, and limit the amount of side-to-side movement that the arm 40 can take during operation while still allowing the arm 40 to rotate up and down. It is useful if the saddle guide(s) 50 does not always rub against the arm 40, as this can cause undesirable friction. It is therefore useful to have a spacing between the saddle guide(s) 50 and the arm 40 that corresponds to the maximum amount of desired side-to-side movement of the arm 40. Including the saddle guide(s) 50 can prolong the life of the connection between the arm 40 and the mounting mechanism 41 by reducing the side-to-side movement that causes wear on the connection during operation as well as reducing the wear on the inner surface of the mounting mechanism 41 that is caused by the arm 40 rubbing against the surface. It has also been found that the saddle guide(s) 50 can improve the fatigue life of the bolt 47 and the spring 44. The saddle guide(s) 50 can be made of any material, with a useful material being UHMW polyethylene since it will not wear the arm 40 if the arm 40 rubs against the saddle guide(s) 50.

The bolt 47 includes, as illustrated in FIG. 8, an upper end 52, a lower end 54 having a lower sleeve 55 positioned thereabout. The lower end 54 of the bolt 47 has a free end 56. As illustrated in FIGS. 6 and 7, a lower portion 64 of arm 40 along with the free end 56 of the bolt 47 form a space 60 (FIG. 6) therebetween. An axis 62 extending longitudinally through the bolt 47 illustrates that the bolt 47 and the arm 40 are operably connected at an angle such that as the axis 62 extends beyond the free end 56 of the bolt 47, the axis 62 does not intersect the lower portion 64 of the arm 40, even though the lower portion 64 of the arm 40 extends beyond the free end 56 of the bolt 47.

In addition, as illustrated in FIG. 8, the spring guide sleeve 48 is positioned around at least an upper one-third of the bolt 47. At least a portion of the spring 44 is positioned between the saddle guide 50 and the spring guide sleeve 48.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural tillage implement, comprising:
   a frame member; and
   a leveling blade assembly including:
      a leveling blade;
      an arm operably coupling the frame member with the leveling blade;
      a mounting mechanism connected at least to the arm;
      a bolt operably connected to the arm and having an upper end, a lower end and a free end;
      a spring assembly including a spring and a spring guide assembly, the spring and the spring guide assembly being coupled with the arm and said frame member, the spring guide assembly including a sleeve that slides inside of the spring and which is made of a non-metallic material;
      at least one saddle guide connected to a surface of the mounting mechanism between the mounting mechanism and the arm, the saddle guide being positioned next to the spring;
   wherein the bolt is positioned through the sleeve and through the spring, the sleeve is positioned about the bolt near an upper end thereof, the sleeve extends downward and covers at least an upper one-third of the bolt, wherein at least a portion of the spring is positioned between the sleeve and the saddle guide.

2. The agricultural tillage implement of claim 1, wherein the spring is a compression spring and the non-metallic material is a UHMW plastic.

3. The agricultural tillage implement of claim 2, wherein the spring guide assembly is a shock absorber which is positioned within the spring.

4. The agricultural tillage implement of claim 1, wherein the saddle guide is spaced a distance from the arm, and wherein the at least one saddle guide comprises two saddle guides positioned across from each other and next to the spring.

5. The agricultural tillage implement of claim 4, wherein a diameter of the sleeve is less than an inner diameter of the spring.

6. The agricultural tillage implement of claim 1, further comprising a lower sleeve positioned about the lower end of the bolt.

7. The agricultural tillage implement of claim 6, wherein the lower end of the bolt is held in a position by the lower sleeve, the lower end having a free end and the arm formed to include a space between the free end and the arm, and wherein a lower end of the arm extends beyond the free end of the bolt.

8. The agricultural tillage implement of claim 7, wherein the bolt and the arm are connected at an angle such that an axis extending through the bolt and through the free end does not intersect the lower portion of the arm.

9. A leveling blade assembly of an agricultural tillage implement including a frame member, the leveling blade assembly comprising:
   a leveling blade;
   an arm configured for coupling the frame member with the leveling blade;
   a bolt operably connected to the arm and including a lower end which has a free end;
   a spring assembly including a spring and a spring guide assembly, the spring and the spring guide assembly being coupled with the arm and being configured for being coupled with the frame member, the spring guide assembly including a sleeve that slides inside of the spring and which is made of a non-metallic material, the sleeve positioned about the bolt near an upper end thereof, the sleeve extending downward and covering at least an upper one-third of the bolt;
   a lower sleeve;
   wherein the bolt is positioned through the sleeve and through the spring, the lower end of the bolt having the lower sleeve positioned thereabout and spaced a distance from the sleeve positioned at an upper end of the bolt, the free end of the bolt and the arm formed to include a space therebetween, a lower end of the arm extending a distance beyond the free end of the bolt.

10. The leveling blade assembly of claim 9, wherein the spring is a compression spring and the non-metallic material sleeve is formed from a UHMW plastic.

11. The leveling blade assembly of claim 10, wherein the spring guide assembly is a shock absorber which is positioned within the spring.

12. The leveling blade assembly of claim 9, further comprising a mounting mechanism connecting the arm to the frame member.

13. The leveling blade assembly of claim 12, further comprising at least one saddle guide connected to a surface of the mounting mechanism between the mounting mechanism and the arm, the saddle guide positioned next to the spring.

14. The leveling blade assembly of claim 13, wherein the sleeve is positioned about the bolt near an upper end thereof and extends about at least an upper one-third of the bolt, and wherein at least a portion of the spring is positioned between the sleeve and the saddle guide.

15. The leveling blade assembly of claim 14, wherein a diameter of the sleeve is less than an inner diameter of the spring.

16. The leveling blade assembly of claim 9, wherein the bolt and the arm are connected at an angle such that an axis extending through the bolt and through the free end does not intersect a lower portion of the arm.

17. A leveling blade assembly of an agricultural tillage implement including a frame member, said leveling blade assembly comprising:
   a leveling blade;
   an arm operably coupling the frame member with the leveling blade;
   a mounting mechanism connected at least to the arm;
   a bolt operably connected to said arm and including an upper end and a lower end which has a free end;
   a spring assembly including a spring and a spring guide assembly, the spring and the spring guide assembly coupled with the arm and configured to be coupled with the frame member, the spring guide assembly including a sleeve that slides inside of the spring; and
   at least one saddle guide connected to a surface of the mounting mechanism between the mounting mechanism and the arm, the saddle guard positioned next to the spring;
   wherein the bolt is positioned through the sleeve and through the spring, and the sleeve is positioned about the bolt near an upper end thereof, such that the sleeve extends downward and covers at least an upper one-third of the bolt, and at least a portion of the spring is positioned between the sleeve and the saddle guard.

18. The leveling blade assembly of claim 17, wherein the saddle guide is spaced a distance from the arm, and wherein the at least one saddle guide comprises at least two saddle guides spaced apart and positioned next to the spring.

* * * * *